Figure 1:
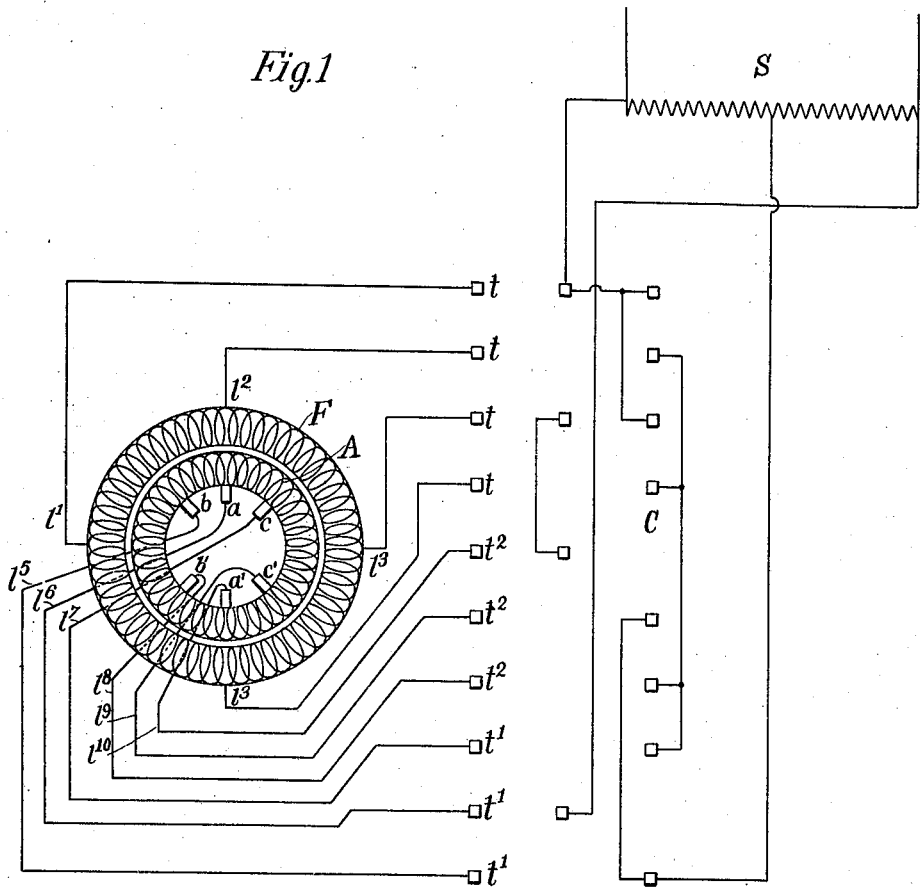

No. 853,107. PATENTED MAY 7, 1907.
R. D. MERSHON.
METHOD OF OPERATING ELECTRIC MOTORS.
APPLICATION FILED FEB. 15, 1904. RENEWED APR. 10, 1907.

3 SHEETS—SHEET 1.

Witnesses: Ralph D. Mershon Inventor by Kerr, Page & Cooper Att'ys.

No. 853,107. PATENTED MAY 7, 1907.
R. D. MERSHON.
METHOD OF OPERATING ELECTRIC MOTORS.
APPLICATION FILED FEB. 15, 1904. RENEWED APR. 10, 1907.

3 SHEETS—SHEET 2.

Witnesses:

Ralph D. Mershon, Inventor
by Kerr, Page & Cooper Att'ys

No. 853,107. PATENTED MAY 7, 1907.
R. D. MERSHON.
METHOD OF OPERATING ELECTRIC MOTORS.
APPLICATION FILED FEB. 15, 1904. RENEWED APR. 10, 1907.

3 SHEETS—SHEET 3.

Witnesses: Ralph D. Mershon Inventor
by Kerr, Page & Cooper Attys.

UNITED STATES PATENT OFFICE.

RALPH D. MERSHON, OF NEW YORK, N. Y.

METHOD OF OPERATING ELECTRIC MOTORS.

No. 853,107.  Specification of Letters Patent.  Patented May 7, 1907.

Application filed February 15, 1904. Renewed April 10, 1907. Serial No. 367,337.

*To all whom it may concern:*

Be it known that I, RALPH D. MERSHON, a citizen of the United States, residing at New York, in the county and State of New York, have invented a certain new and useful Method of Operating Electric Motors, of which the following is a specification, reference being had to the drawings accompanying and forming part of the same.

My invention relates more particularly to alternating current motors of the commutating type, both "series" and "repulsion", and has for its object to maintain the power factor of the motor, or the torque per ampere, equal to, or above, a certain value, throughout the range of speed over which the motor is to be operated.

As is well known to those skilled in the art, the power factor in a commutating motor is greater, for a given number of poles, the higher its speed of rotation is in percentage of synchronous speed for such number of poles. Or, stated differently, the torque per ampere is greater for a given speed, other things being equal, the greater the number of poles. Hence, when operating at low speed, by making the number of poles greater and thus making the synchronous speed of the motor lower, the power factor may be increased. The actual speed at which the motor is running is therefore a higher percentage of synchronous speed, and the power factor is accordingly greater. The efficiency of the motor, however, is less than with a smaller number of poles, for well understood reasons. Hence it is desirable to operate with a small number of poles. But in this case, if the motor be started with the small number of poles, the power factor may be too low, since the actual speed is so low in comparison with the synchronous speed. I therefore propose, in operating such a motor, to run it with a relatively large number or numbers of poles at the low speed or speeds, thereby securing a high power factor, though with some loss of efficiency; and, when the speed has increased to such an extent that its ratio to synchronism for a smaller number of poles is such that the power factor with such number of poles would not drop below a given limit, the number of poles is reduced to that number; the power factor will therefore be as high as needed or desired, while at the same time the losses which occurred with the greater number of poles will be reduced and the efficiency of the motor correspondingly increased. It is obvious that this procedure may be repeated as often as desired, throughout any range of speed.

Considering the matter from the standpoint of torque instead of the power factor, by this method a given torque may be maintained throughout the motor's range of speed with a less number of amperes per unit of torque than would be required if a greater number of poles were not used with the lower speed or speeds. For example, if the motor be started with a small number of poles, which might be called its normal number, a relatively high current will be required to produce the necessary torque. But if a larger number of poles be used in starting the same torque may be developed with less current. The motor would therefore be allowed to run with this number of poles until its speed is such that to produce the same torque with a smaller number of poles at the same speed would not require per unit of torque, a number of amperes exceeding the limit set. The number of poles may then be reduced, thus maintaining the same torque with the same or not much greater current, while at the same time increasing the efficiency of the motor by reducing the losses incident to the greater number of poles. It will therefore be seen that less current has been required to bring the motor up to the desired speed with the normal number of poles than would have been required if the motor had been started with its normal number of poles. It should be understood, however, that by "less current" I mean less current from the supply circuit to the transformer from which the motor itself gets its current. The current to the motor may be the same or greater, although the apparent watts will be less, owing to the difference in voltage on the motor side of the transformer.

The above general explanation will serve to indicate the fundamental principle of my method, but the invention also embraces other features which will be more fully explained hereinafter.

Figure 2:
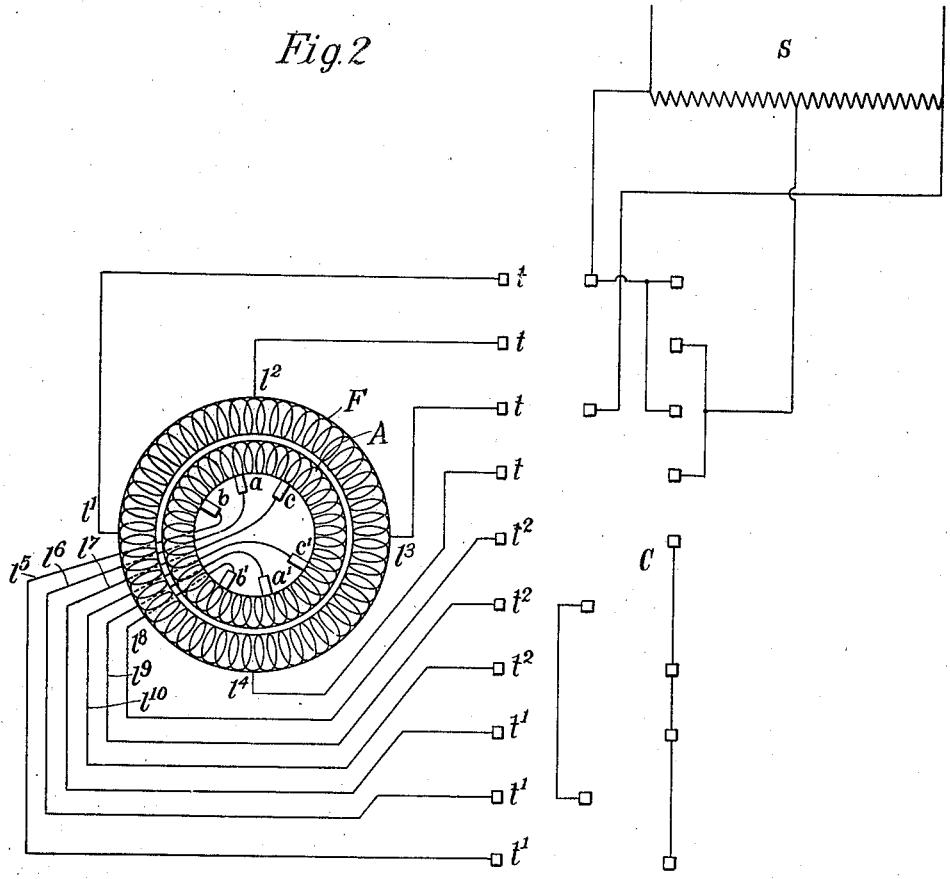
Figure 3:
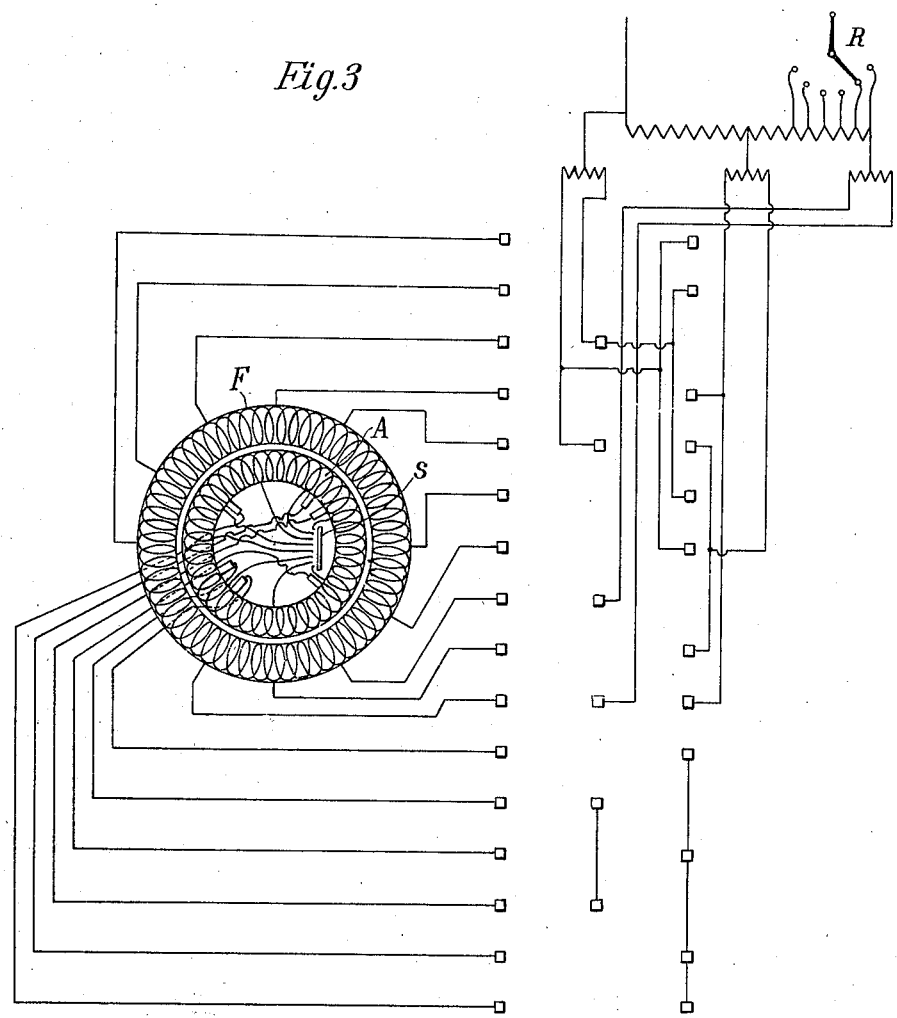

Referring now to the drawings: Figure 1 represents diagrammatically a series motor in which the number of poles may be two or four. Fig. 2 is a diagram showing a repulsion motor arranged to run with two or four poles. Fig. 3 is a diagram showing a repulsion motor with two or four poles, provided with means for transforming it into an induction motor by short-circuiting the windings of one of its elements, and also provided with means whereby a desired flux distribution in the primary may be produced.

In the various figures, the stationary element is indicated by F, and the rotating element by A. They are both shown with uniform ring windings; but it should be understood that the nature of the winding, whether ring, drum, uniformly or non-uniformly distributed or other, is immaterial, so long as it will lend itself to change in the number of poles. Each element is shown as having a single winding, but it should be understood that either element or both may have two or more windings, as for example, one winding for each number of poles at which the motor is to be operated. Likewise the form of the field and armature is immaterial, whether with salient poles or not, if the number of poles may be varied in both. For simplicity in the diagrams, the commutator in each figure is shown as being in and part of the winding, a construction sometimes used in direct current machines.

In Figs. 1 and 2 the leads to the field are indicated by $l'$, $l^2$, $l^3$, $l^4$, brought out to contacts $t$. From the commutator brushes $a$, $b$, $c$, leads $l^5$, $l^6$, $l^7$ are brought out to contacts $t'$, and from brushes $a'$, $b'$, $c'$ leads $l^8$, $l^9$, $l^{10}$ are carried to contacts $t^2$. The single phase source of current is indicated at S. A controller is diagrammatically shown at C. By tracing the connections it will be seen that in the first position of the controller two poles will be produced in the field and in the armature. In the next position four poles will be produced in each. In all the figures the brushes are shown as always in contact with the commutator, but each one may of course be raised when not in use. For instance, in Figs. 1 and 2, when $a$ and $a'$ are in use the others may be raised, and conversely. Also, $a$, $a'$ might be made to serve for $b'$, $c$, or $b$, $c'$, by shifting $a$, $a'$ to the proper points when the four pole connection is made. Similarly in Fig. 3. In Fig. 1 the brushes are shown at positions of no lead, that is, midway between poles. In practice they would be off of these points an extent, usually slight, depending upon the design of the motor.

In operating the motors represented by Figs. 1 and 2, according to my invention, the maximum number of poles is used for the low speeds and the minimum for the higher speeds. Beginning, for example, with the maximum, (in the present instance four), with this number of poles less current per unit of torque will be required to produce the desired torque than would be the case if two poles were used in starting. When the speed with four poles has increased sufficiently the number of poles may be reduced to two, whereupon the same torque is exerted, but with greater efficiency. The time of changing the number of poles will in practice depend upon several considerations. For example, the design of the machine will have a good deal to do with it, as will also the voltage impressed on the motor. It will also depend upon the value of the power factor which it is desired to maintain. That is, if a high power factor is required, the speed would generally be allowed to attain a greater percentage of synchronism before changing, in order to make the existing speed a higher percentage of synchronous speed for the new number of poles. In general it may be said that the precise time of making the change would be determined by the operator, who can be guided by a watt-meter, ammeter, or power factor indicator, or by his experience.

The principle is the same in reducing the speed of the motor and its load by causing the motor to exert a negative torque. Here the kinetic energy, or inertia, stored in the moving mass or masses, will be transformed into electrical energy and delivered to the supply circuit, for utilization by translating devices elsewhere on the line. Likewise the potential energy of the load, as in the case of a train descending a grade. It should therefore be understood that the invention is not limited to operating a motor at increasing speed, but is also applicable for braking or reducing the speed.

For reasons well understood by those skilled in the art, it is desirable that the E. M. F.'s in the coils of the armature due to its rotation be of approximately the same form as the current flowing. This can be secured by producing the proper flux distribution in the primary or field.

In my co-pending application, Serial No. 174,698, I have described and claimed broadly a method of producing any desired flux distribution, by leading in the current or currents at a plurality of points per pole, which method may be employed here. Fig. 3 illustrates a system arranged for practicing this method in connection with the present invention. Two leads per pole are employed, but of course a greater number may be used if desired. As fully explained in my co-pending application above mentioned, the flux distribution may be varied by varying the number of leads per pole, also by varying the distance between the leads, or both. The motor illustrated in this figure is of the repulsion type, but it is obvious that the series motor is equally adapted for the production of a desired flux distribution in a similar way. In all the figures it will be seen that the voltage is changed, as well as the number of poles, when the controller is shifted. This is ordinarily desirable. If, however, it is desired to vary the voltage for any particular pole number (to increase or decrease the torque), this may be readily effected in a variety of well known ways. For example, one method of accomplishing it is indicated by the diagrammatic dial switch R, Fig. 3. The same or any of the well known means may of course be employed with the series motor when desired.

Instead of running the motor as a series or repulsion motor at the higher speeds, it may be transformed into an induction motor by the simple expedient of short-circuiting the windings of the secondary or armature, as, for example, in the manner illustrated in Fig. 3. Here a device $s$ is adapted to make contact with conductors connected with the armature windings at suitable points. In the figure the conductors are connected at eight points, though of course the number may be varied as desired, generally the more the better. The short-circuiting switch may be located on the armature and operated in any convenient way, as by means of a rod parallel with the shaft, or the short-circuiting may be effected in any other convenient manner. For instance the short-circuiting leads may be brought to slip rings and brushes outside of the motor and there short-circuited. In operating a motor provided with such a device it may at any time be operated as an induction motor, as before stated. For instance, the machine may be run as a series or repulsion motor until it has reached a desired speed, as one approximating synchronism for an existing number of poles, then the armature may be short-circuited as described and the motor from there on run as an induction motor, its speed being varied by variations in the number of its poles. At any time the switch may be opened and the motor again operated as a series or repulsion machine. This furnishes in effect a convenient method of starting an induction motor, as will be readily understood. After a speed approximating synchronism for the maximum number of poles has been attained as a series or repulsion motor it may thereafter be operated as an induction motor, and its speed may then be increased by a simple commutation of its poles. In the drawing I have shown provision for two numbers of poles and therefore two speeds in the induction motor, but it is plain that the possible numbers of poles may be as many more as desired. In another co-pending application, Serial No. 190,440, I have described at length and claimed broadly a novel method of varying the speed of a motor by varying the number of its poles in such a way that the torque, positive or negative, which the motor can exert with each new number of poles, at the speed existing after the change has been completed, is sufficient to produce acceleration or retardation as the case may be. This method may of course be practiced with advantage in this connection. The motors can of course be reversed in the well known way, and it is therefore not necessary to illustrate means for effecting the reversal. The series motor can be reversed by reversing the relative connection of the armature and field, and the repulsion motor by shifting the brushes so that they have a lead of the same amount as before, but on the opposite side of the neutral point.

I do not claim herein the apparatus described above, but do so in my co-pending application filed of even date herewith, Serial No. 193,548.

Having now described my invention, what I claim is:

1. The method of operating commutating motors adapted for change in the number of poles, to maintain a power factor equal to or above a predetermined limit, which consists in running the motor with one number of poles with a power factor equal to or above the limit, until the speed of the motor has been brought to the desired percentage of synchronous speed for another number of poles, and after such percentage has been reached, changing to the other number of poles, as set forth.

2. The method of operating commutating motors adapted for change in the number of poles, to maintain a power factor equal to or above a predetermined limit, which consists in running the motor with one number of poles with a power factor equal to or above the limit, allowing the motor to change in speed until it has reached the desired percentage of synchronous speed for another number of poles, and changing to the other number of poles, as set forth.

3. The method of operating commutating motors adapted for change in the number of poles, to maintain a power factor equal to or above a predetermined limit, which consists in running the motor with one number of poles with a power factor equal to or above the limit, until the speed has been brought to the desired percentage of synchronous speed for another number of poles, changing to the other number of poles, allowing the speed to change until it has reached the desired percentage of synchronous speed for another number of poles, changing to the other number of poles, and repeating such step or steps until the normal number of poles has been reached, as set forth.

4. The method of operating commutating motors adapted for change in the number of poles, to maintain a power factor equal to or above a predetermined limit, which consists in running the motor with one number of poles with a power factor equal to or above the limit, allowing the motor to change in speed until its speed has reached the desired percentage of synchronous speed for another number of poles, changing to the other number of poles, again allowing the speed to change until it has reached the desired percentage of synchronous speed for another number of poles, changing to the other number of poles, and repeating such step or steps until the normal number of poles has been reached, as set forth.

5. The method of operating commutating motors, to maintain a power factor equal to or above a predetermined limit, which consists in starting the motor with a maximum number of poles, allowing its speed, with a power factor equal to or above a predetermined limit, to increase until the desired percentage of synchronous speed for a lesser number of poles has been reached, and changing to the lesser number of poles, as set forth.

6. The method of operating commutating motors, to maintain a power factor equal to or above a predetermined limit, which consists in starting the motor with a maximum number of poles, allowing its speed, with a power factor equal to or above the limit, to increase until the desired percentage of synchronous speed for a lesser number of poles has been reached, changing to the lesser number of poles, again allowing the speed, to increase with a power factor equal to or above the limit, until the desired percentage of synchronous speed for a lesser number of poles is reached, changing to the lesser number of poles, and repeating such step or steps until the minimum number of poles has been reached, as set forth.

7. The method of operating a motor provided with a commutator, which consists in running the motor, with the commutator, at a maximum number of poles, allowing its speed to approximate synchronism for such number of poles, short-circuiting the armature winding or windings, and thereafter varying the number of poles to increase the speed of the motor, as set forth.

8. The method of operating a motor provided with a commutator, which consists in running the motor, with the commutator, at a maximum number of poles, changing the number of poles when the speed attains the desired percentage of synchronous speed for the new number of poles, and when the speed after the change approximates synchronism for the new number of poles, short-circuiting the windings of the secondary or armature and operating the motor as an induction motor, as set forth.

9. The method of operating a motor provided with a commutator, which consists in running the motor with the commutator, at a maximum number of poles, changing the number of poles when the speed attains the desired percentage of synchronous speed for the new number of poles, short-circuiting the windings of the secondary or armature when the speed after the change in the number of poles approximates synchronism for the new number of poles, and thereafter varying the number of poles to increase or decrease the speed, as set forth.

10. The method of operating commutating motors, which consists in feeding the current or currents thereto at a plurality of points per pole to produce a desired distribution of magnetic flux, running the motor with one number of poles with a power factor equal to or above a predetermined limit, until the speed of the motor has been brought to the desired percentage of synchronous speed for another number of poles, and after such percentage has been reached changing to the other number of poles, as set forth.

11. The method of operating commutating motors, which consists in feeding the current or currents thereto at a plurality of points per pole to produce a desired distribution of magnetic flux, running the motor with one number of poles with a power factor equal to or above a predetermined limit, until the speed has been brought to the desired percentage of synchronous speed for another number of poles, changing to the other number of poles, allowing the speed to change until it has reached the desired percentage of synchronous speed for another number of poles, changing to the other number of poles, and repeating such step or steps until the normal number of poles has been reached, as set forth.

12. The method of operating commutating motors, which consists in feeding the current or currents thereto at a plurality of points per pole to produce a desired distribution of magnetic flux, running the motor, with the commutator, at a maximum number of poles, allowing its speed to approximate synchronism for such number of poles, short-circuiting the armature winding or windings, and thereafter varying the number of poles to increase the speed of the motor, as set forth.

13. The method of operating commutating motors, which consists in feeding the current or currents thereto at a plurality of points per pole to produce a desired distribution of magnetic flux, running the motor, with the commutator, at a maximum number of poles, changing the number of poles when the speed attains the desired percentage of synchronous speed for the new number of poles, and when the speed after the change approximates synchronism for the new number of poles, short-circuiting the windings of the secondary or armature and operating the motor as an induction motor, as set forth.

14. The method of operating a commutating motor, which consists in feeding the current or currents thereto at a plurality of points per pole to produce a desired distribution of magnetic flux, running the motor with the commutator, at a maximum number of poles, changing the number of poles when the speed attains the desired percentage of synchronous speed for the new number of poles, short-circuiting the windings of the secondary or armature when the speed after the change in the number of poles approximates synchronism for the new number of poles, and thereafter varying the number of poles to increase or decrease the speed, as set forth.

RALPH D. MERSHON.

Witnesses:
    A. E. MAHAN,
    S. S. DUNHAM.